(12) United States Patent
Sakurai

(10) Patent No.: US 8,830,514 B2
(45) Date of Patent: Sep. 9, 2014

(54) NETWORK PRINTING SYSTEM, MANAGEMENT SERVER AND CONTROL METHOD THEREFOR, AND COMPUTER-READABLE MEDIUM

(71) Applicant: Canon Kabushiki Kaisha, Tokyo (JP)

(72) Inventor: Yuka Sakurai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/692,955

(22) Filed: Dec. 3, 2012

(65) Prior Publication Data

US 2013/0194626 A1  Aug. 1, 2013

(30) Foreign Application Priority Data

Jan. 26, 2012 (JP) ................................ 2012-014575

(51) Int. Cl.
*G06F 3/12* (2006.01)
*G06K 15/00* (2006.01)

(52) U.S. Cl.
CPC ............ *G06F 3/1296* (2013.01); *G06F 3/1207* (2013.01); *G06F 3/1204* (2013.01); *G06F 3/1259* (2013.01); *G06F 3/1292* (2013.01)
USPC ............................ 358/1.15; 358/1.9; 358/305

(58) Field of Classification Search
None
See application file for complete search history.

(56) References Cited

U.S. PATENT DOCUMENTS

| | | | | |
|---|---|---|---|---|
| 6,665,712 B2 * | 12/2003 | Pickup | ........................... | 709/219 |
| 7,256,900 B1 * | 8/2007 | Hanaoka | ...................... | 358/1.12 |
| 7,707,274 B2 * | 4/2010 | Umehara et al. | .............. | 709/219 |
| 2003/0011805 A1 * | 1/2003 | Yacoub | ......................... | 358/1.15 |

FOREIGN PATENT DOCUMENTS

JP  2011-28347 A  2/2011

* cited by examiner

*Primary Examiner* — Thomas Lett
(74) *Attorney, Agent, or Firm* — Fitzpatrick, Cella, Harper & Scinto

(57) ABSTRACT

A system in which a terminal instructs printing via a management server, wherein the management server comprises: a unit which manages location information and function information of each of a plurality of image forming apparatuses included in the network printing system; a unit which receives, from the terminal, printing conditions and location information of the terminal; a unit which selects an image forming apparatus to execute printing from the plurality of image forming apparatuses in accordance with the received printing conditions and location information of the terminal; a unit which generates a map based on the location information of the terminal and the location information of the image forming apparatus to display a positional relationship between the terminal and the selected image forming apparatus; and a unit which sends the generated map to the terminal.

12 Claims, 18 Drawing Sheets

| 700 | 701 | 702 | 703 | 704 | 705 | 706 | 707 | 708 | 709 |

| IMAGE FORMING APPARATUS ID | IMAGE FORMING APPARATUS NAME | IP ADDRESS | LOCATION INFORMATION ||| FUNCTION ||| STATUS |
|---|---|---|---|---|---|---|---|---|---|
| | | | LATITUDE | LONGITUDE | ALTITUDE | COLOR | BOOKBINDING | STAPLING | |
| AAA000 | LBP0001 | 192.168.10.20 | N35 21'45.70 | E138 43'52.90 | 10 | BW | | O | STARTED |
| AAA001 | LBP0002 | 192.168.10.21 | N35 21'45.40 | E138 43'52.80 | 15 | BW | | | OFF |
| AAA002 | MFP0004 | 192.168.10.22 | N35 21'45.90 | E138 43'52.70 | 15 | CL | O | O | STARTED |
| AAA003 | MFP003 | 192.168.10.23 | N35 21'45.80 | E138 43'52.40 | 20 | CL | | O | STARTED |

| 710 | 711 | 712 | 713 |

| FLOOR MAP | LOCATION INFORMATION ||| |
|---|---|---|---|
| | LATITUDE | LONGITUDE | ALTITUDE |
| floor_1A.jpeg | N35 21'45.10~21'45.30 | E138 43'52.20~43'52.60 | 10 |
| floor_1B.jpeg | N35 21'45.40~21'45.90 | E138 43'52.60~43'52.90 | 10 |
| floor_2A.jpeg | N35 21'45.10~21'45.30 | E138 43'52.20~43'52.60 | 15 |
| floor_2B.jpeg | N35 21'45.40~21'45.90 | E138 43'52.60~43'52.90 | 15 |
| floor_3.jpeg | N35 21'45.10~21'45.90 | E138 43'52.20~43'52.90 | 20 |

F I G. 8A 800   801   802   803

| TERMINAL ID | TERMINAL NAME | MANAGEMENT USER | NOTIFICATION DESTINATION |
|---|---|---|---|
| 101 | Mobail-A | UserA | userA@mobail.co.jp |
| 102 | DesktopB | UserB | userB@desktop.co.jp |
| 103 | DesktopA | UserA | userA@desktop.co.jp |
| 104 | Mobail-C | UserC | userC@mobail.co.jp |

512

F I G. 8B 804   805   806   807   808

| TERMINAL ID | ACQUISITION DATE/TIME | LOCATION INFORMATION | | |
|---|---|---|---|---|
| | | LATITUDE | LONGITUDE | ALTITUDE |
| 101 | 2011/3/21 9:00 | N35 21'45.12 | E138 43'52.30 | 10 |
| 102 | 2011/3/22 9:00 | N35 21'45.13 | E138 43'52.31 | 15 |
| 103 | 2011/3/23 9:05 | N35 21'45.14 | E138 43'52.32 | 15 |
| 104 | 2011/3/24 9:00 | N35 21'45.76 | E138 43'52.84 | 10 |

| 514 — PRINT TARGET DATA | OUTPUT DESTINATION | USER TERMINAL ID | USER NAME | OUTPUT TIME | COLLECTION TIME | STATUS |
|---|---|---|---|---|---|---|
| △△△.doc | AAA000 | Mobail-A | UserA | 2011/3/21 9:05 | 2011/3/21 9:10 | COLLECTED |
| ◆◆.ppt | AAA001 | DesktopB | UserB | 2011/3/21 9:21 | 2011/3/21 9:21 | COLLECTED |
| ○○.ppt | AAA000 | DesktopA | UserA | 2011/3/21 11:45 | | UNCOLLECTED |
| xx.doc | AAA003 | DesktopA | UserA | 2011/3/21 11:46 | | UNCOLLECTED |

900  901  902  903  904  905  906

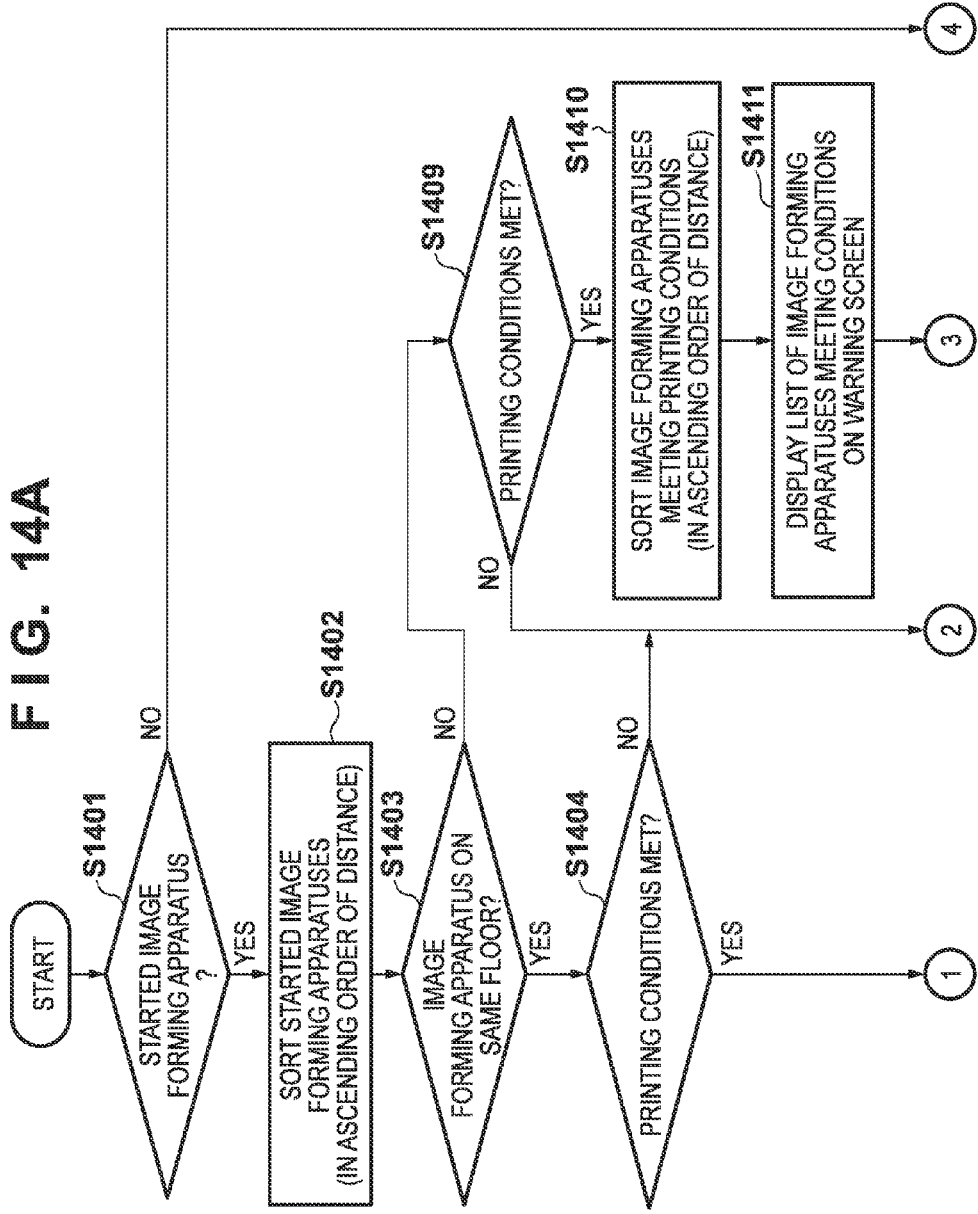

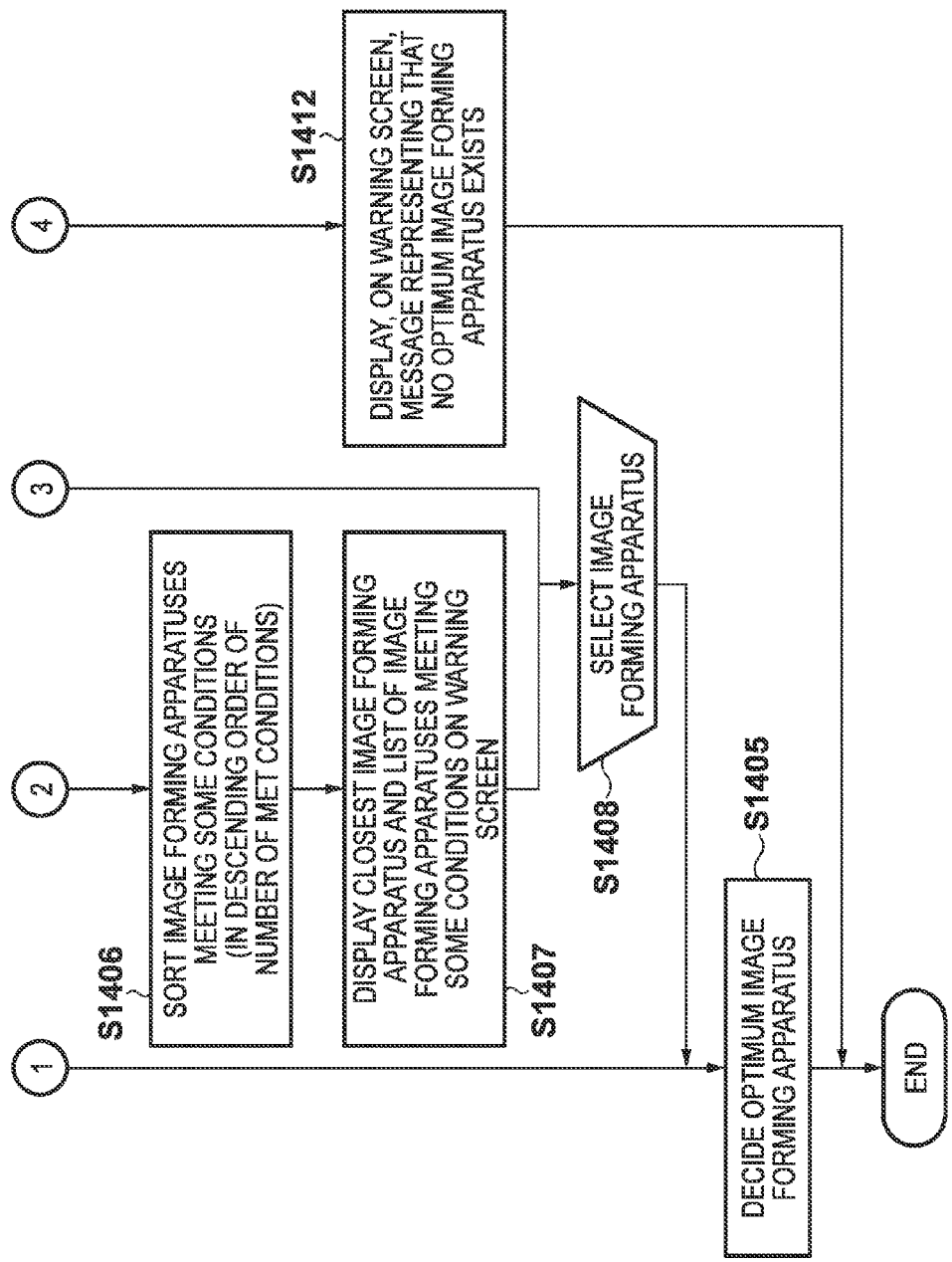

NETWORK PRINTING SYSTEM, MANAGEMENT SERVER AND CONTROL METHOD THEREFOR, AND COMPUTER-READABLE MEDIUM

BACKGROUND OF THE INVENTION

1. Field of the Invention

The present invention relates to a network printing system, a management server and a control method therefor, and a computer-readable medium and, more particularly, to a technique of displaying a map representing the positional relationship between a client computer and an image forming apparatus.

2. Description of the Related Art

Against the backdrop of recent short supply of electricity, the trend toward energy consumption reductions is expected to continue also into the future. Under this environment, a building or office where a number of image forming apparatuses exist may experience a situation in which only a minimum number of image forming apparatuses are used (started).

Additionally, in an environment such as a free address environment where the location of work changes every time, a nearby image forming apparatus (optimum output device) is preferably automatically selected without user selection.

Japanese Patent Laid-Open No. 2011-28347 discloses a network printing system formed from a client computer and an image forming apparatus (MFP) which can communicate with lighting equipment using visible light. Even if the relative positional relationship between the client computer and the image forming apparatus has changed, the area where the client computer is arranged and the area where the image forming apparatus is arranged can be specified based on the lighting equipment. In Japanese Patent Laid-Open No. 2011-28347, before execution of printing, the client computer receives a list of MFPs existing in a nearby area from a server and displays the list, thereby allowing the user to select a desired MFP.

In the system described in Japanese Patent Laid-Open No. 2011-28347, however, the list of nearby image forming apparatuses (MFPs) is presented to the user so that he/she can easily select an image forming apparatus before execution of printing. In Japanese Patent Laid-Open No. 2011-28347, the area where the image forming apparatus is arranged can be specified based on the position of the lighting equipment. However, it is impossible to specify the detailed position of the apparatus. Additionally, in Japanese Patent Laid-Open No. 2011-28347, the list of MFPs is displayed to cause the user to do selection before execution of printing. Hence, the user cannot confirm after printing to which MFP he/she has issued the print instruction.

In an environment where start of an image forming apparatus is restricted or an environment where printing is executed without user's selection of an image forming apparatus, the user cannot know which image forming apparatus has printed. For this reason, the user visually searches for the image forming apparatus that has printed and output, requiring time to collect the output product.

SUMMARY OF THE INVENTION

The present invention has been made in considerate of the above-described problems, and provides a network printing system that, when executing printing from a client computer, automatically selects an optimum image forming apparatus and provides a map representing the positional relationship between the selected image forming apparatus and the client computer.

According to one aspect of the present invention, there is provided a network printing system in which a user terminal instructs printing via a management server, the management server comprising: a management unit configured to manage location information and function information of each of a plurality of image forming apparatuses included in the network printing system; a receiving unit configured to receive, from the user terminal, printing conditions and location information of the user terminal; a selection unit configured to select an image forming apparatus to execute printing from the plurality of image forming apparatuses in accordance with the received printing conditions and location information of the user terminal; a generation unit configured to generate a map based on the location information of the user terminal and the location information of the image forming apparatus selected by the selection unit to display a positional relationship between the user terminal and the selected image forming apparatus; and a sending unit configured to send the map generated by the generation unit to the user terminal, and the user terminal comprising a map display unit configured to display the map received from the management server.

According to another aspect of the present invention, there is provided a management server in a network printing system in which a user terminal instructs printing via the management server, comprising: a management unit configured to manage location information and function information of each of a plurality of image forming apparatuses included in the network printing system; a receiving unit configured to receive, from the user terminal, printing conditions and location information of the user terminal; a selection unit configured to select an image forming apparatus to execute printing from the plurality of image forming apparatuses in accordance with the received printing conditions and location information of the user terminal; a generation unit configured to generate a map based on the location information of the user terminal and the location information of the image forming apparatus selected by the selection unit to display a positional relationship between the user terminal and the selected image forming apparatus; and a sending unit configured to send the map generated by the generation unit to the user terminal.

According to another aspect of the present invention, there is provided a method of controlling a management server in a network printing system in which a user terminal instructs printing via the management server, comprising: managing location information and function information of each of a plurality of image forming apparatuses included in the network printing system; receiving, from the user terminal, printing conditions and location information of the user terminal; selecting an image forming apparatus to execute printing from the plurality of image forming apparatuses in accordance with the received printing conditions and location information of the user terminal; generating a map based on the location information of the user terminal and the location information of the image forming apparatus selected in the selecting to display a positional relationship between the user terminal and the selected image forming apparatus; and sending the map generated in the generating to the user terminal.

According to another aspect of the present invention, there is provided a non-transitory computer-readable medium storing a program that causes a computer to function as: a management unit configured to manage location information and function information of each of a plurality of image forming apparatuses included in a network printing system; a receiving unit configured to receive, from a user terminal that instructs printing, printing conditions and location information of the user terminal; a selection unit configured to select an image forming apparatus to execute printing from the plurality of image forming apparatuses in accordance with the received printing conditions and location information of the user terminal; a generation unit configured to generate a map based on the location information of the user terminal and the location information of the image forming apparatus selected by the selection unit to display a positional relationship between the user terminal and the selected image forming apparatus; and a sending unit configured to send the map generated by the generation unit to the user terminal.

According to the present invention, an image forming apparatus is automatically selected based on the positional relationship between the client computer and the image forming apparatus, and the relative positions of the apparatuses is displayed as a map, thereby improving user convenience in printing.

Further features of the present invention will become apparent from the following description of exemplary embodiments (with reference to the attached drawings).

BRIEF DESCRIPTION OF THE DRAWINGS

FIGS. 7A and 7B are views showing examples of tables provided in an image forming apparatus management unit;

FIGS. 8A and 8B are views showing examples of tables provided in a user terminal information management unit;

FIG. 9 is a view showing an example of a table provided in a print job execution unit;

FIGS. 14A and 14B are flowcharts showing an example of image forming apparatus selection processing;

DESCRIPTION OF THE EMBODIMENTS

A mode for carrying out the present invention will now be described with reference to the accompanying drawings.

First Embodiment

Figure 1:
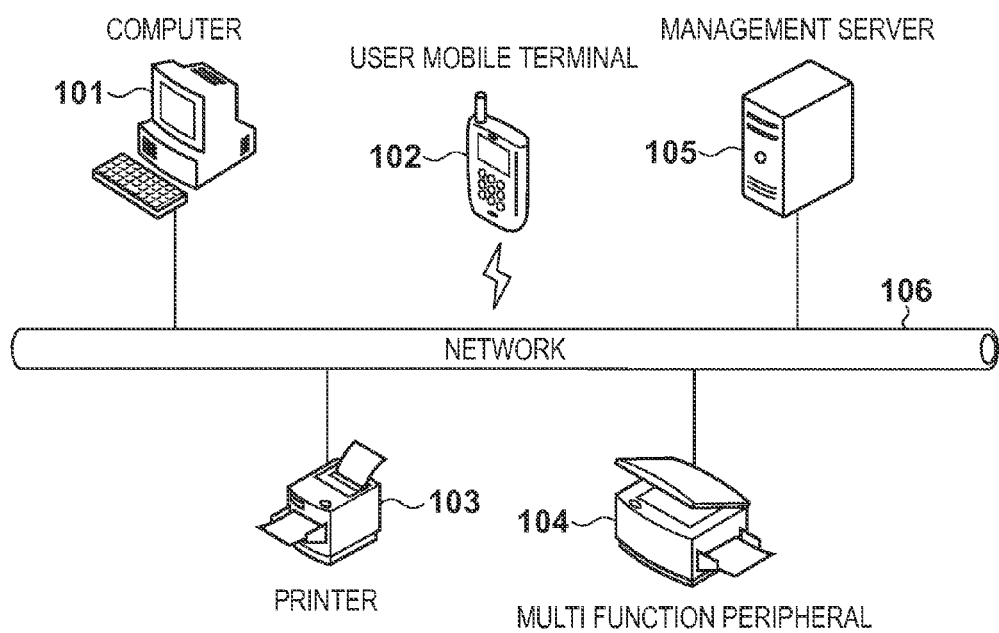
FIG. 1 is a schematic view showing the arrangement of an image forming apparatus management system.

[System Arrangement]
FIG. 1 is a schematic view showing an example of the arrangement of a network printing system according to an embodiment of the present invention. Referring to FIG. 1, a computer 101 is used by a user to generate image data and print. The computer 101 includes hardware resources to be described later and software resources including an OS (Operating System). The computer 101 is connected to image forming apparatuses connected to a network 106 so as to be communicable with them by a predetermined protocol.

A user mobile terminal 102 is used by a user to generate image data and print. The user mobile terminal 102 includes hardware resources to be described later and software resources including an OS. The user mobile terminal 102 also includes a wireless network interface and is connected to the image forming apparatuses connected to the network 106 so as to be communicable with them by a predetermined protocol. The computer 101 and the user mobile terminal 102 each of which functions as a client computer will be referred to as user terminals altogether.

A printer 103 receives print data received via the network 106 and prints it on an actual paper sheet using a known printing technique such as electrophotography or inkjet. A multi function peripheral (MFP) 104 receives print data received via the network and prints it on an actual paper sheet using a known printing technique such as electrophotography or inkjet. The multi function peripheral 104 may also have a function of reading a paper document via a scanner and copying or converting it into image data and sending the data by Email or the like. A printer without the copy function is also applicable, as a matter of course. The printer 103 and the multi function peripheral 104 will generically be referred to as image forming apparatuses.

A management server 105 manages the printer 103 and the multi function peripheral 104, automatically selects the printer 103 or the multi function peripheral 104 in accordance with a print request from the user, and sends a print job.

Note that the computer 101, the user mobile terminal 102, the printer 103, the multi function peripheral 104, and the management server 105 are connected to be communicable with each other via the network 106 by a known technique such as Ethernet®. Note that the network 106 can be either a wired or a wireless network. In this embodiment, the management server 105 is provided separately from the printer 103 and the multi function peripheral 104. However, a module having the same function may be provided in the printer 103 or the multi function peripheral 104. In this case, the network communication performed between the management server 105 and the printer 103 or the multi function peripheral 104 is replaced with data transfer via a system bus or the like.

Figure 2:
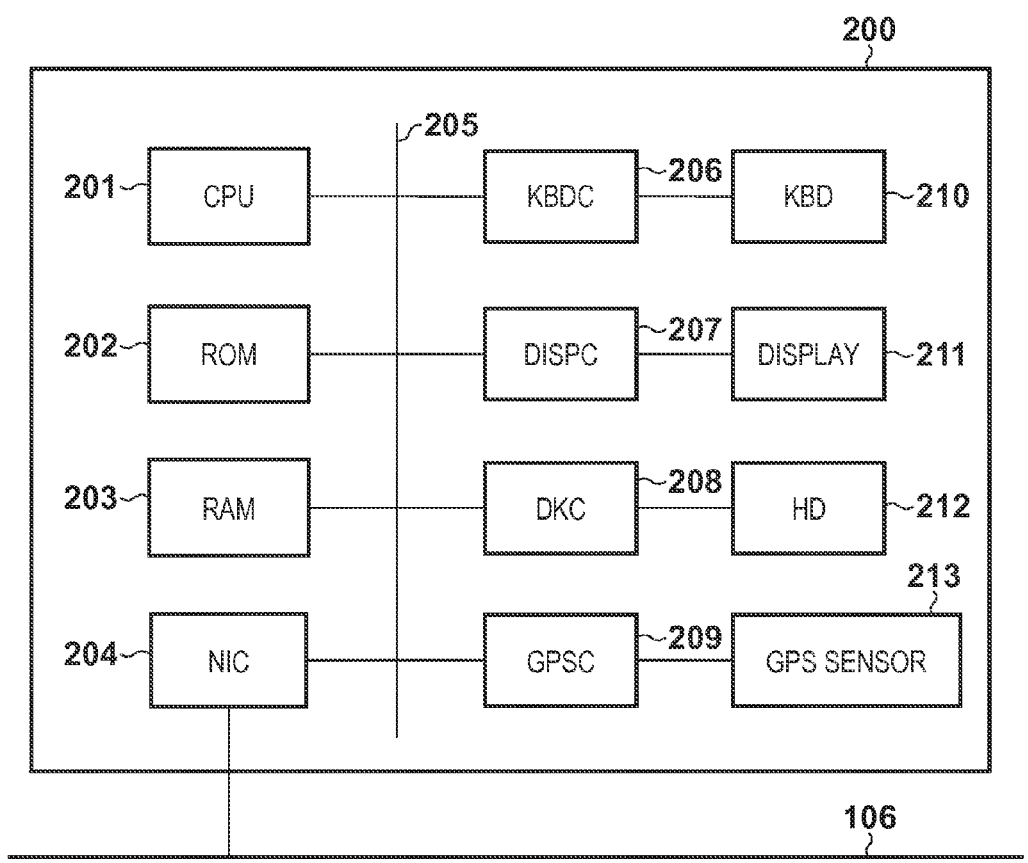
FIG. 2 is a block diagram showing an example of the internal arrangement of an information processing apparatus.

[Internal Arrangement of Computer]
FIG. 2 is a block diagram showing an example of the internal arrangement of information processing apparatuses that constitute the computer 101, the user mobile terminal 102, and the management server 105. The information processing apparatuses will generally be explained as a PC 200.

The PC 200 includes a CPU 201 that executes software stored in a ROM 202 or, for example, an HD (Hard Disk) 212 serving as a mass storage device. The CPU 201 systematically controls each piece of hardware connected to a system bus 205. A RAM 203 functions as, for example, the main memory or work area of the CPU 201. A network interface card (NIC) 204 bidirectionally exchanges data with another node via the network 106.

A keyboard controller (KBDC) 206 controls instruction input from a keyboard (KBD) 210 provided on the PC 200. A display controller (DISPC) 207 controls display on a display module (DISPLAY) 211 formed from, for example, a liquid crystal display.

A disk controller (DKC) 208 controls the HD 212 that is a mass storage image forming apparatus. A GPS sensor controller (GPSC) 209 controls upon reception of a signal from a GPS sensor 213.

[Internal Arrangement of Multi Function Peripheral]

Figure 3:
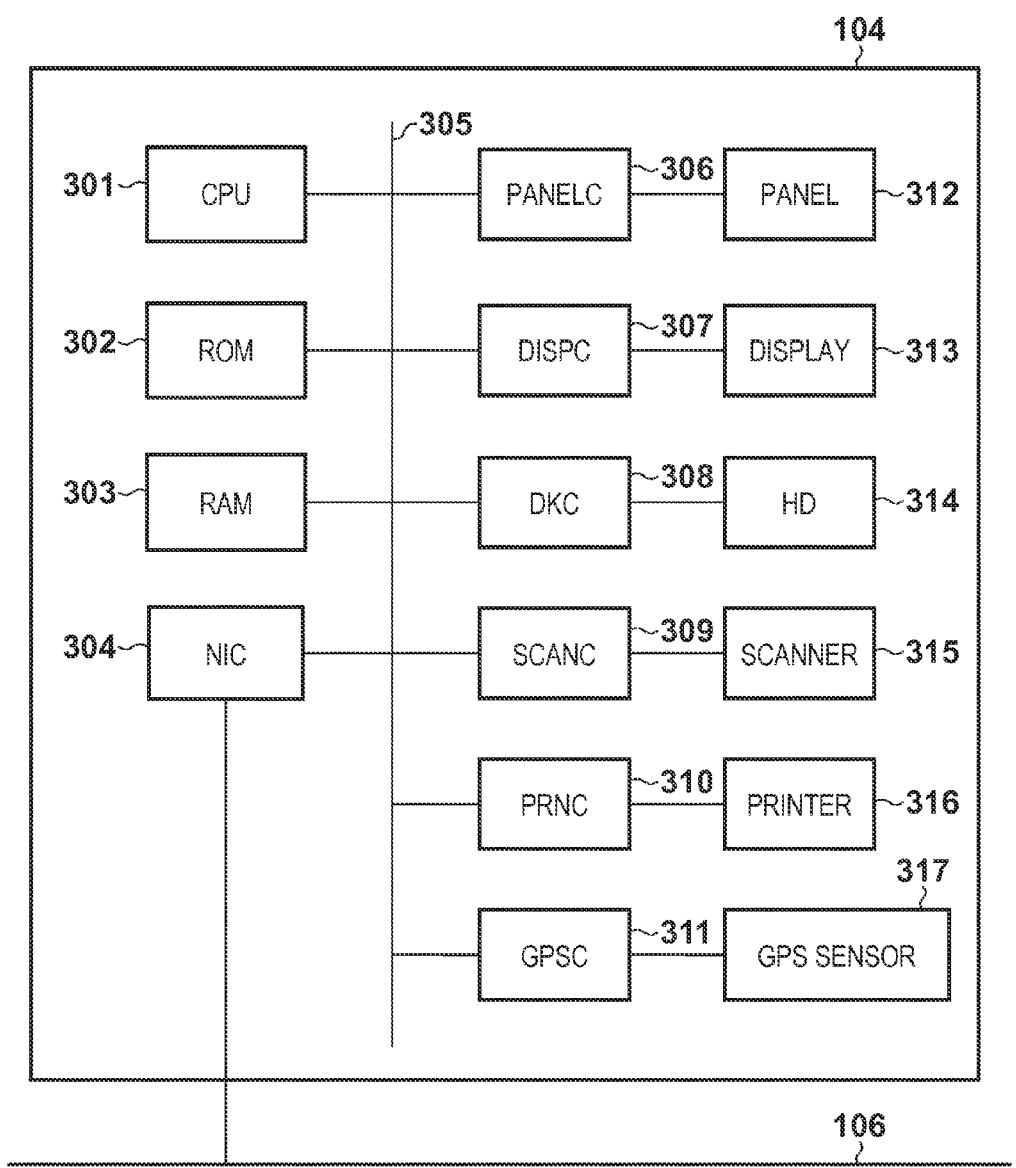
FIG. 3 is a block diagram showing an example of the internal arrangement of a multi function peripheral.

FIG. 3 is a block diagram showing an example of the internal arrangement of the multi function peripheral 104 shown in FIG. 1. The multi function peripheral 104 includes a CPU 301 that executes software stored in a ROM 302 or, for example, an HD (Hard Disk) 314 serving as a mass storage device. The CPU 301 systematically controls each piece of hardware connected to a system bus 305.

A RAM 303 functions as, for example, the main memory or work area of the CPU 301. A network interface card (NIC) 304 exchanges data with another node via the network 106. A panel controller (PANELC) 306 controls instruction input from an operation panel (PANEL) 312 provided on the multi function peripheral 104.

A display controller (DISPC) 307 controls display on a display module (DISPLAY) 313 formed from, for example, a liquid crystal display. A disk controller (DKC) 308 controls the HD 314 that is a mass storage image forming apparatus. A scanner controller (SCANC) 309 controls an optical scanner device (scanner) 315 provided in the multi function peripheral 104 and reads a paper document.

A printer controller (PRNC) 310 controls a printing device (printer) 316 provided in the multi function peripheral 104 and prints on an actual paper sheet using a known printing technique such as electrophotography or inkjet. A GPS sensor controller (GPSC) 311 receives a signal from a GPS sensor 317 and controls.

Note that the internal arrangement of the printer 103 shown in FIG. 1 can be considered as an arrangement obtained by removing the scanner controller 309 and the optical scanner device 315 from the above-described multi function peripheral 104. The arrangement may be obtained by removing the panel controller (PANELC) 306, the operation panel 312, the display controller (DISPC) 307, the display module (DISPLAY) 313, and the like.

[Functional Arrangement of User Mobile Terminal]

Figure 4A:
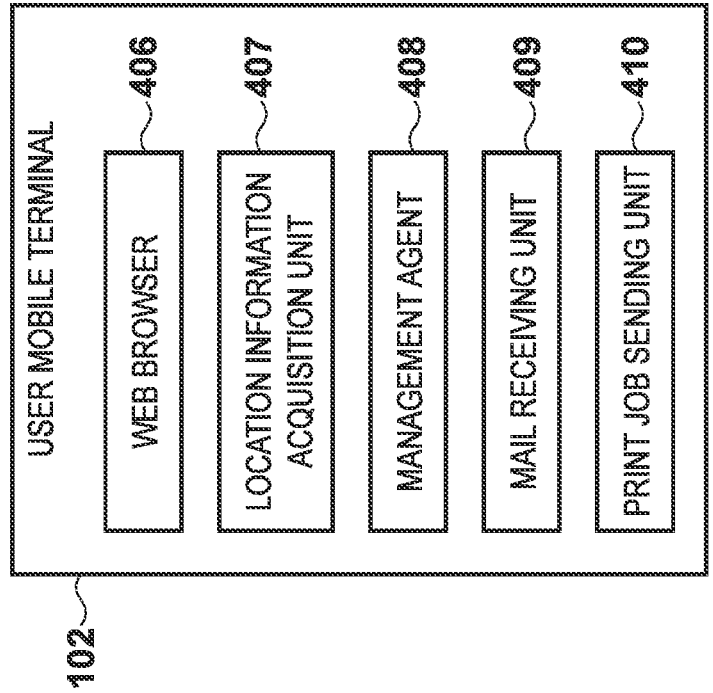
FIGS. 4A and 4B are block diagrams showing examples of the functional arrangements of the information processing apparatuses.

FIG. 4A is a block diagram showing an example of the functional arrangement of the computer 101 shown in FIG. 1. A web browser 401 accesses the management server 105 and provides a screen to input a print instruction. A location information acquisition unit 402 acquires location information (latitude, longitude, altitude, and the like) of the computer from the GPS sensor 213 provided in the computer 101.

A mail receiving unit 403 receives mail from the management server 105. A print job sending unit 404 sends a print job to the management server 105 when the user presses a print execution button (not shown) arranged in the screen to input a print instruction on the web browser 401. When inputting a print instruction, the print job sending unit 404 designates printing conditions and sends the print job to the management server 105 together with location information acquired from the location information acquisition unit 402.

Figure 4B:
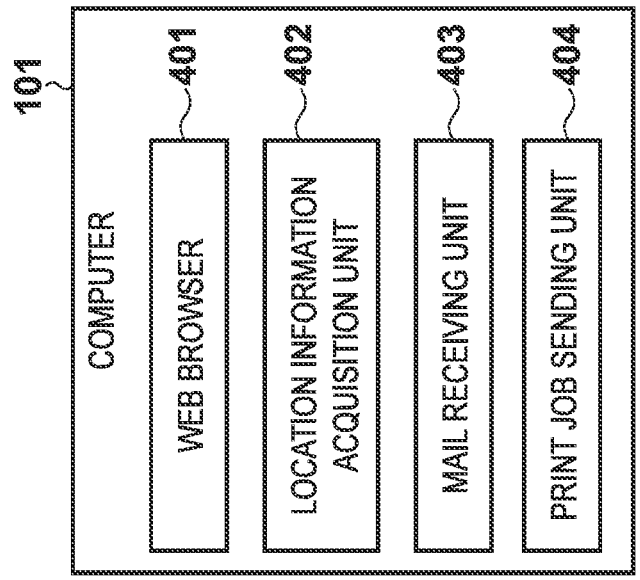

FIG. 4B is a block diagram showing an example of the functional arrangement of the user mobile terminal 102 shown in FIG. 1. A web browser 406 accesses the management server 105 and provides a screen to input a print instruction. A location information acquisition unit 407 acquires location information (latitude, longitude, altitude, and the like) of the user mobile terminal 102 from the GPS sensor 317 provided in the user mobile terminal 102. Upon detecting a change in the location information, a management agent 408 sends the location information and information acquired by various kinds of sensors to the management server 105.

A mail receiving unit 409 receives mail from the management server 105. A print job sending unit 410 sends a print job to the management server 105 when the user presses a print execution button (not shown) arranged in the screen to input a print instruction on the web browser 406. When inputting a print instruction, the print job sending unit 410 designates printing conditions and sends the print job to the management server 105 together with location information acquired from the location information acquisition unit 407. Note that the screen displayed on the web browser 406 is assumed to provide the same functions as those of the screen displayed on the web browser 401 in the computer 101.

[Functional Arrangement of Management Server]

Figure 5:
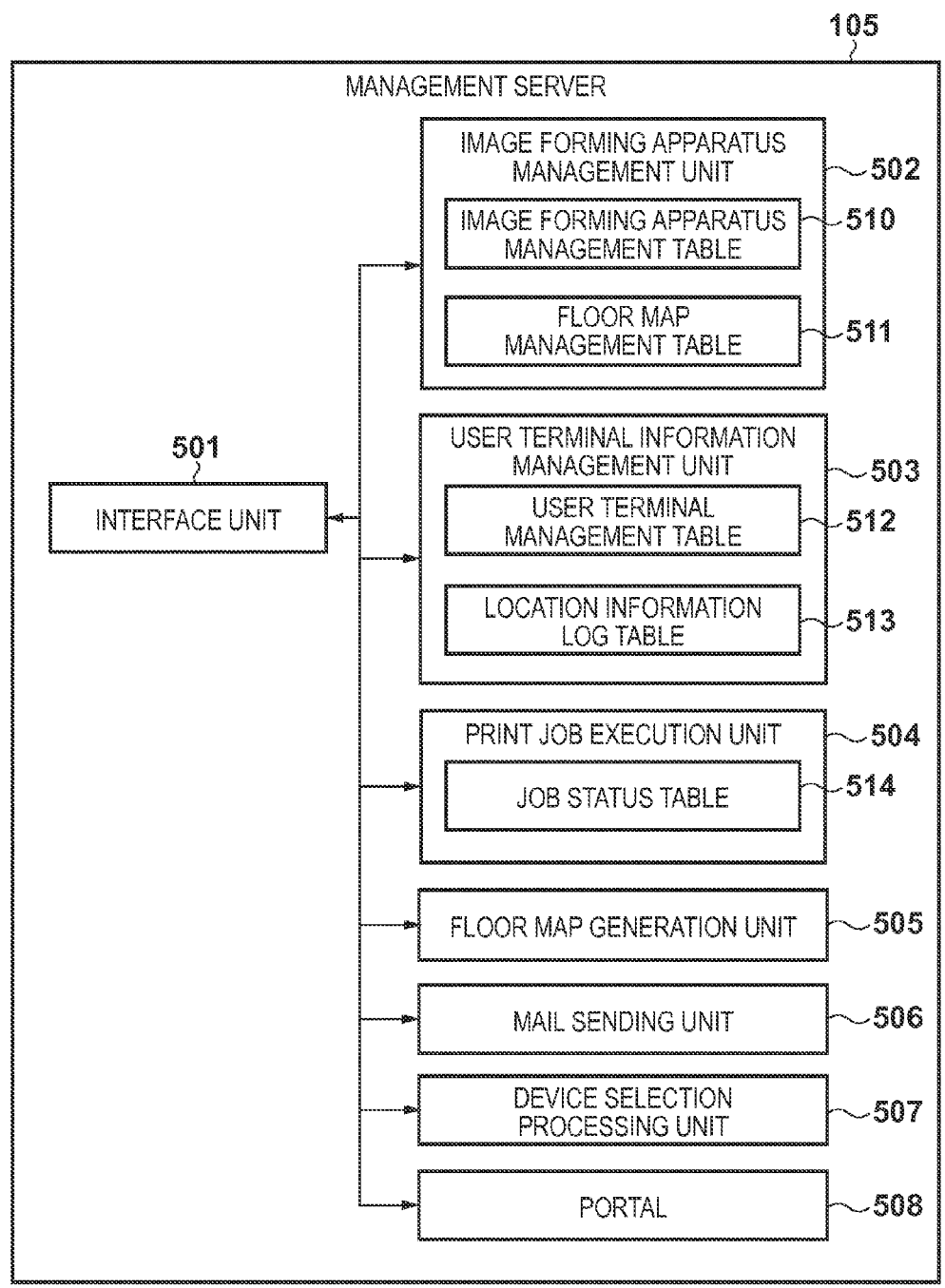
FIG. 5 is a block diagram showing an example of the functional arrangement of a management server.

FIG. 5 is a block diagram showing an example of the functional arrangement of the management server 105 shown in FIG. 1. An interface unit 501 communicates with the computer 101, the user mobile terminal 102, the printer 103, and the multi function peripheral 104 via the network 106 through the NIC 204 shown in FIG. 2. An image forming apparatus management unit 502 holds information about management target image forming apparatuses. The image forming apparatus management unit 502 acquires information such as location information from the printer 103 and the multi function peripheral 104 via the interface unit 501, and stores the information. The image forming apparatus management unit 502 holds the information as an image forming apparatus management table 510 and a floor map management table 511. The arrangement of the image forming apparatus management table 510 will be described later with reference to FIG. 7A. The arrangement of the floor map management table 511 will be described later with reference to FIG. 7B.

A user terminal information management unit 503 holds information about management target user terminals. The user terminal information management unit 503 acquires information from the computer 101 and the user mobile terminal 102 via the interface unit 501. The user terminal information management unit 503 also receives location information sent from the computer 101 and the user mobile terminal 102, generates a location information log, and stores it. The user terminal information management unit 503 holds the information as a user terminal management table 512 and a location information log table 513. The arrangement of the user terminal management table 512 will be described later with reference to FIG. 8A. The arrangement of the location information log table 513 will be described later with reference to FIG. 8B.

A print job execution unit 504 sends a print job to the printer 103 or the multi function peripheral 104 via the interface unit 501. The print job execution unit 504 includes a job status table 514 to manage execution target jobs. The arrangement of the job status table 514 will be described later with reference to FIG. 9.

A floor map generation unit 505 adds location information received from the computer 101 or the user mobile terminal 102 and location information of an image forming apparatus selected by a device selection processing unit 507 to a floor map, and generates a map representing the path between the user terminal and the output destination image forming apparatus. Examples of the map used here and the map display will be described later with reference to FIGS. 16A, 16B, 17A, and 17B.

When the user wants to collect an output product later, a mail sending unit 506 sends, to the user terminal, a URL (Uniform Resource Locator) to display the floor map generated by the floor map generation unit 505. Based on location information and printing conditions received from the computer 101 or the user mobile terminal 102, the device selection processing unit 507 selects an image forming apparatus that most meets the conditions from the image forming apparatuses managed by the image forming apparatus management unit 502. A portal 508 is used to accept a print job from the computer 101 or the user mobile terminal 102. The portal 508 also provides an acceptance screen to the user via the web browser 401 of the computer 101 or the web browser 406 of the user mobile terminal 102.

[Functional Arrangement of Multi Function Peripheral]

Figure 6:
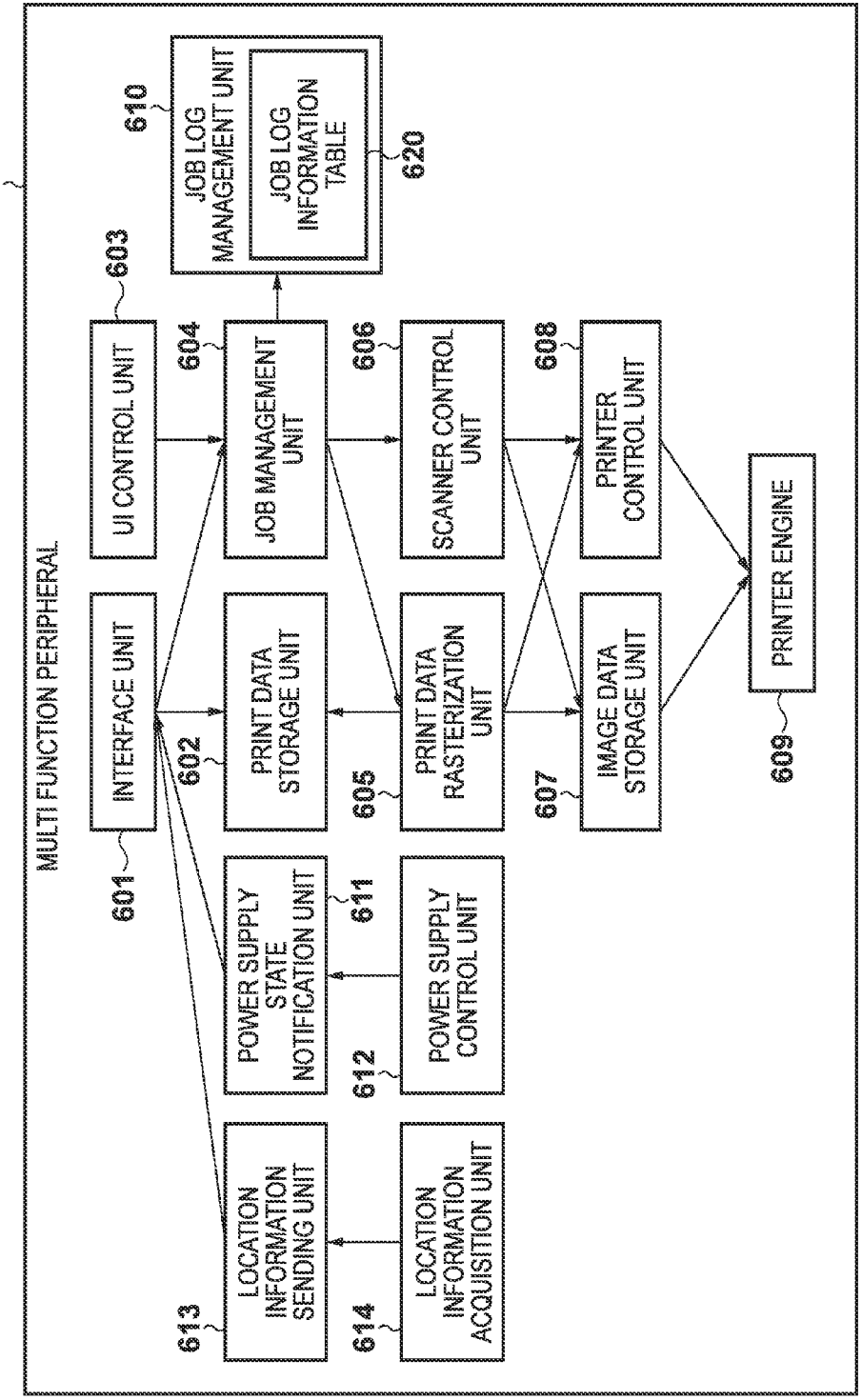
FIG. 6 is a block diagram showing an example of the functional arrangement of the multi function peripheral.

FIG. 6 is a block diagram showing an example of the functional arrangement of the multi function peripheral 104 shown in FIG. 1. An interface unit 601 is connected to the network 106 and receives a print job from the management server 105. A print data storage unit 602 temporarily stores print job data. A UI control unit 603 controls the operation panel (PANEL) 312 via the panel controller (PANELC) 306 and accepts a copy instruction or a scan sending instruction from the user to the multi function peripheral 104.

A job management unit 604 analyzes the print job received from the management server 105. The job management unit 604 acquires output attribute information such as a user name, the number of copies, and color printing, and manages them as job information together with the job start date/time. A print data rasterization unit 605 acquires print data from the print data storage unit 602 and performs image generation processing in accordance with the job information stored in the job management unit 604 to generate image data on the RAM 303.

A scanner control unit 606 controls the scanner controller 309 to scan a document and generate image data. Note that if an ADF (Auto Document Feeder), an RDF, or the like is connectable as a document feeder, the scanner control unit 606 controls document feed and document discharge from the ADF or RDF. When reading a double-sided document, the scanner control unit 606 may control document reversing.

An image data storage unit 607 temporarily stores image data generated by the print data rasterization unit 605 or the scanner control unit 606. A printer control unit 608 controls a printer engine 609 and causes it to print the image data stored in the image data storage unit 607. The printer engine 609 actually prints the image data stored in the image data storage unit 607 on a medium such as a printing paper sheet using a known printing technique such as electrophotography or inkjet.

A job log management unit 610 manages job log information as a job log information table 620. When a job is complete, the job management unit 604 sends job information under management to the job log management unit 610 as job log information (history information of the completed job), and the job log management unit 610 stores the information. The job log management unit 610 manages the received job log information on the job log information table 620, and sends the job log information in response to a request from the management server 105. Note that the notification via the interface unit 601 can be done using either a unique protocol or a publicly defined protocol. Even the management server 105 designated in advance may notify a plurality of partners by multicast or broadcast. The arrangement of the job log information is not particularly limited.

A location information acquisition unit 614 acquires location information (latitude, longitude, altitude, and the like) of the multi function peripheral 104 from the GPS sensor 317. A location information sending unit 613 sends the location information to the management server 105 in response to a location information acquisition request from the management server 105. Upon detecting a change in the location information, the location information sending unit 613 may send the location information to the management server 105. Note that the arrangement of the printer 103 without the scanner function can be considered as an arrangement obtained by removing the scanner control unit 606 and the UI control unit 603 from the arrangement of the multi function peripheral 104 described with reference to FIG. 6.

[Image Forming Apparatus Management Table]

FIG. 7A is a view showing an example of the image forming apparatus management table 510 provided in the image forming apparatus management unit 502 shown in FIG. 5. Referring to FIG. 7A, a column 700 indicates image forming apparatus IDs each used to uniquely identify an image forming apparatus in the system. A column 701 indicates the image forming apparatus name of the image forming apparatus on each row. A column 702 indicates the IP address of the image forming apparatus on each row.

Columns 703 to 705 indicate the location information of the image forming apparatus on each row. The location information of each image forming apparatus can be acquired by the image forming apparatus management unit 502 from the multi function peripheral via the network 106. The column 703 indicates the latitude of the image forming apparatus on each row. The column 704 indicates the longitude of the image forming apparatus on each row. The column 705 indicates the altitude of the image forming apparatus on each row.

Columns 706 to 708 indicate the function information of the image forming apparatus on each row. The column 706 indicates whether the image forming apparatus on each row is a monochrome apparatus or a color apparatus. The column 707 indicates whether the image forming apparatus on each row has a bookbinding function. The column 708 indicates whether the image forming apparatus on each row has a stapling function.

A column 709 indicates the status (started or off) of the image forming apparatus on each row.

Executable functions and location information of each image forming apparatus can be known from these pieces of information managed by the image forming apparatus management unit 502.

[Floor Map Management Table]

FIG. 7B is a view showing an example of the floor map management table 511 provided in the image forming apparatus management unit 502 shown in FIG. 5. Referring to FIG. 7B, a column 710 indicates floor maps. This corresponds to the image data of each floor. Columns 711 to 713 indicate the application range of the floor map on each row. That is, the columns 711 to 713 indicate the location information of the range represented by each floor map. The column 711 indicates the latitude range of the floor map on each row. The column 712 indicates the longitude range of the floor map on each row. The column 713 indicates the altitude of the floor map on each row.

On which floor each image forming apparatus is arranged can be known from these pieces of information managed by the image forming apparatus management unit 502.

[User Terminal Management Table]

FIG. 8A is a view showing an example of the user terminal management table 512 provided in the user terminal information management unit 503 shown in FIG. 5. Referring to FIG. 8A, a column 800 indicates terminal IDs each representing an ID used to uniquely identify a user terminal in the system. A column 801 indicates terminal names. A column 802 indicates the names of management users each representing a user who manages a user terminal. A column 803 indicates notification destinations each representing, for example, the mail address of a user terminal or the management user of a user terminal.

[Location Information Log Table]

FIG. 8B is a view showing an example of the location information log table provided in the user terminal information management unit 503 shown in FIG. 5. The user terminal information management unit 503 stores pieces of location information received from a plurality of user terminals in the location information log table 513 as a location information log together with the location information acquisition dates/times.

Referring to FIG. 8B, a column 804 indicates terminal IDs each representing an ID used to uniquely identify a user terminal in the system. A column 805 indicates acquisition dates/times each representing a date/time when location information has been acquired. Columns 806 to 808 indicate the location information of the user terminal on each row. The column 806 indicates the latitude of the user terminal on each row. The column 807 indicates the longitude of the user terminal on each row. The column 808 indicates the altitude of the user terminal on each row.

The movement history of each user terminal can be known from these pieces of information managed by the user terminal information management unit 503.

[Job Status Table]

FIG. 9 is a view showing an example of the job status table 514 provided in the print job execution unit 504 shown in FIG. 5. Referring to FIG. 9, a column 900 indicates print target data sent from the print job sending unit 404 of the computer 101 or the print job sending unit 410 of a user terminal. A column 901 indicates output destinations each representing the image forming apparatus ID of an image forming apparatus selected by the device selection processing unit 507.

A column 902 indicates the terminal IDs of user terminals that have executed print jobs. A column 903 indicates the names of users who have executed print jobs. A column 904 indicates times of print job execution. A column 905 indicates times when the output products of output print target data have been collected from image forming apparatuses. The column 906 indicates statuses (collection states) each representing whether the output product of the output print target data has been collected. A collection state management unit is thus implemented.

Note that the status of print target data is updated from "uncollected" to "collected" at, for example, the following timings. That is, a load sensor (not shown) is installed in the image forming apparatus, and when an output product is collected, this load sensor may send a notification to the management server 105, thereby updating the status. Alternatively, when an output product is collected, the management server 105 may accept some instruction from the user and update the status based on the instruction.

Who has issued what kind of print job in which terminal, and whether the user has collected the output product of the output print target data can be known by these pieces of information.

[Flowchart of Network Printing System]

Figure 10:
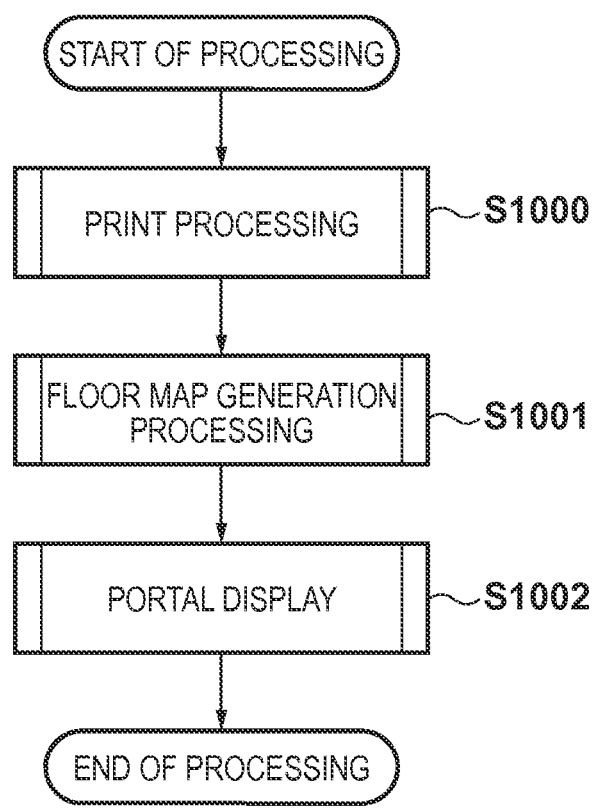
FIG. 10 is a flowchart showing an example of a network printing system.

FIG. 10 is a flowchart of the network printing system according to this embodiment. In step S1000, the management server 105 performs print processing. In the print processing, the management server 105 automatically determines an optimum image forming apparatus in response to a print request from the user, and executes a print job in the determined image forming apparatus. Details will be described later with reference to FIG. 11.

In step S1001, the management server 105 performs floor map generation processing. In the floor map generation processing, the management server 105 generates a floor map representing the positional relationship between the user terminal and the image forming apparatus in which the print job is executed in step S1000. Details will be described later with reference to FIG. 12.

In step S1002, the management server 105 performs portal display. In the portal display, the management server 105 changes, in accordance with the type of user terminal, the display form of the floor map generated in step S1001. Details will be described later with reference to FIG. 13.

(Print Processing)

Figure 11:
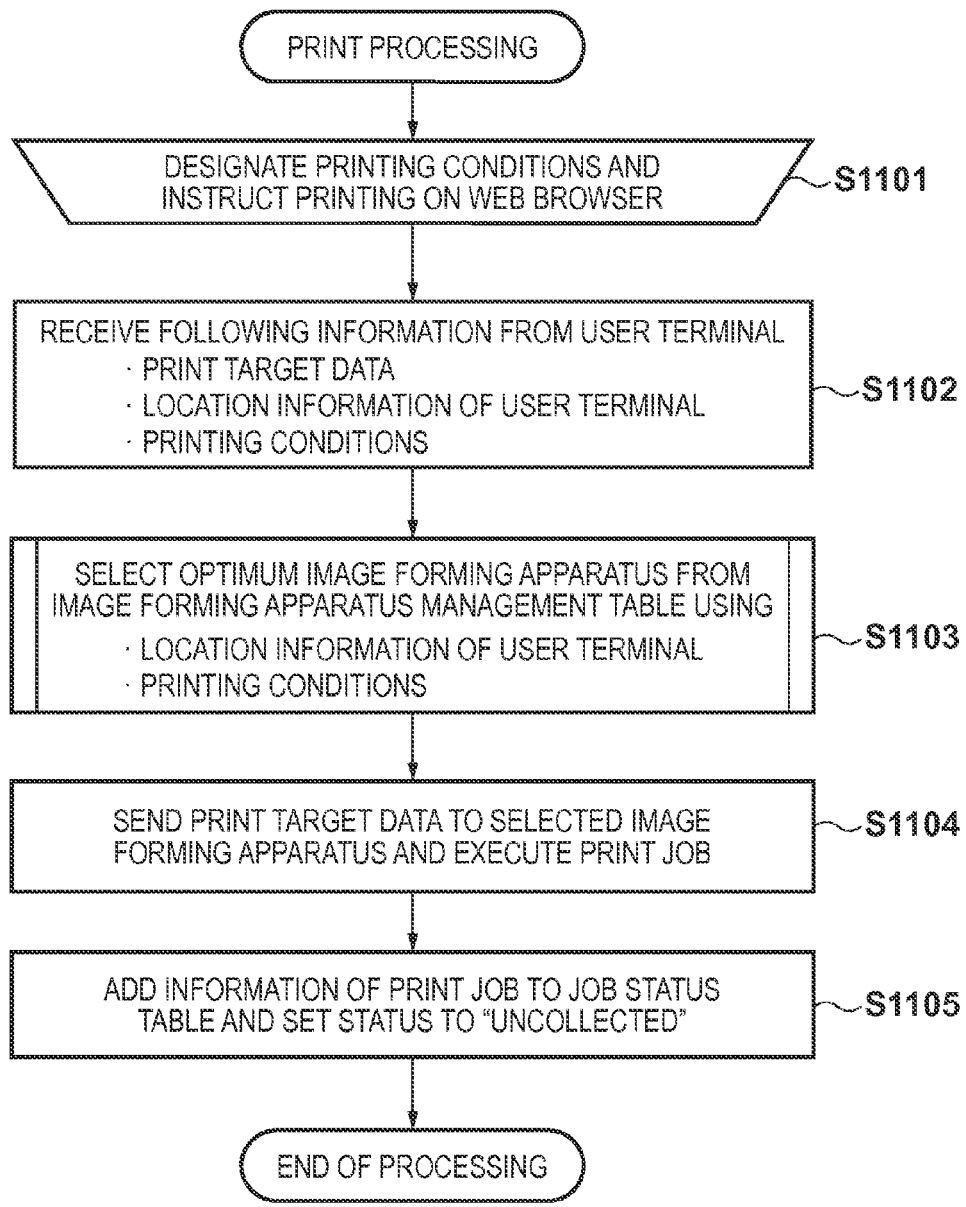
FIG. 11 is a flowchart showing an example of printing processing.

FIG. 11 is a flowchart showing an example of the printing processing in step S1000 of FIG. 10.

In step S1101, the user accesses the portal 508 of the management server 105 from the web browser 401 or 406 provided in the computer 101 or the user mobile terminal 102. The user designates printing conditions and print target data from the screen provided by the portal 508, and instructs execution of a print job. When the user instructs execution of a print job, the printing conditions, the print target data, and the location information of the terminal acquired by the location information acquisition unit 402 or 407 provided in the computer 101 or the user mobile terminal 102 are sent to the management server 105.

In step S1102, the management server 105 receives the printing conditions, the print target data, and the location information of the user terminal sent in step S1101.

In step S1103, the device selection processing unit 507 selects an optimum image forming apparatus from the image forming apparatus management table 510 held by the image forming apparatus management unit 502 using the printing conditions and the location information of the user terminal. Details will be described later with reference to FIGS. 14A and 14B.

In step S1104, the print job execution unit 504 sends the print target data received from the user terminal to the image forming apparatus selected in step S1103 and executes the print job. In step S1105, the print job execution unit 504 adds the information of the print job to the job status table 514. In this case, the print job execution unit 504 sets the status of the column 906 for the print job to "uncollected".

(Floor Map Generation Processing)

Figure 12:
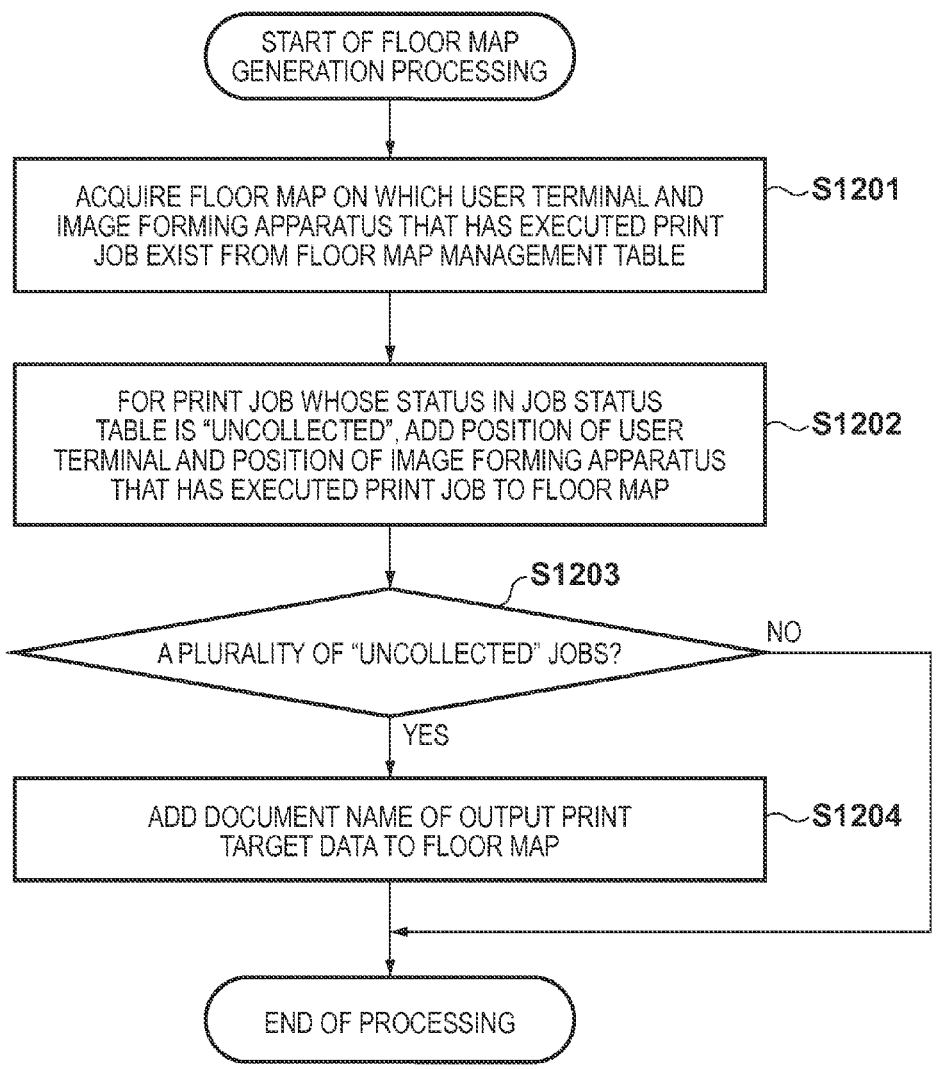
FIG. 12 is a flowchart showing an example of floor map generation processing.

FIG. 12 is a flowchart showing an example of the floor map generation processing in step S1001 of FIG. 10.

In step S1201, the floor map generation unit 505 looks up the floor map management table 511 shown in FIG. 7B, which is held by the image forming apparatus management unit 502, and acquires a floor map in which the user terminal and the image forming apparatus that has executed the print job exist. In step S1202, regarding a print job whose status indicated by the column 906 of the job status table 514 is "uncollected", the floor map generation unit 505 adds the position of the user terminal and the position of the image forming apparatus that has executed the print job to the floor map. A map representing the path between the user terminal and the output destination image forming apparatus is thus generated.

In step S1203, the floor map generation unit 505 determines whether there exist a plurality of print jobs in the status "uncollected". If there exist a plurality of print jobs whose status indicated by the column 906 of the job status table 514 is "uncollected" (YES in step S1203), the process advances to step S1204. If a plurality of print jobs in the status "uncollected" do not exist (NO in step S1203), the processing procedure ends. In step S1204, the floor map generation unit 505 adds the document name of each output print target data to the floor map generated in step S1202 in correspondence with the image forming apparatus that has output the data. Note that the information added here is not limited to the document name, and another information such as an output date/time may be added to be displayed. Then, the processing procedure ends.

Figure 16A:
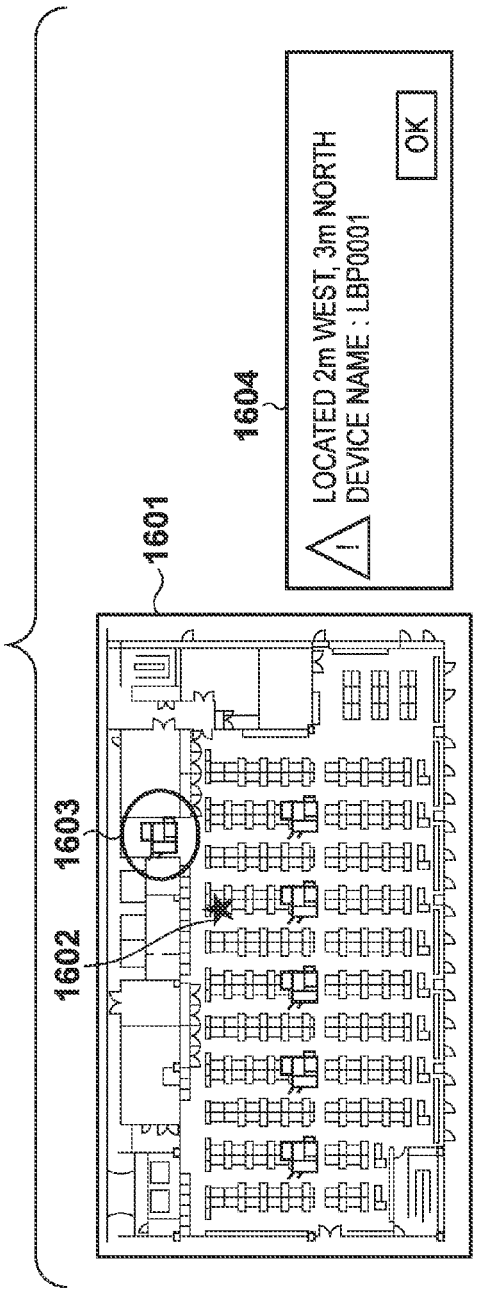
FIGS. 16A and 16B are views showing an example of map display.

An example of the arrangement of the generated floor map will be explained with reference to FIG. 16A. Referring to FIG. 16A, an icon 1602 indicating the position of the user terminal and an icon 1603 indicating the image forming apparatus that has executed the print job are shown on a floor map 1601. Other image forming apparatuses located on the floor may be displayed on the floor map. A screen 1604 of the detail information of the position of the user and the position of the image forming apparatus that has executed the print job is also displayed. The arrangement of the detail information screen is not limited to that shown in FIG. 16A and may include other information. Display of the detail information screen will be described later with reference to FIG. 13.

Figure 17B:
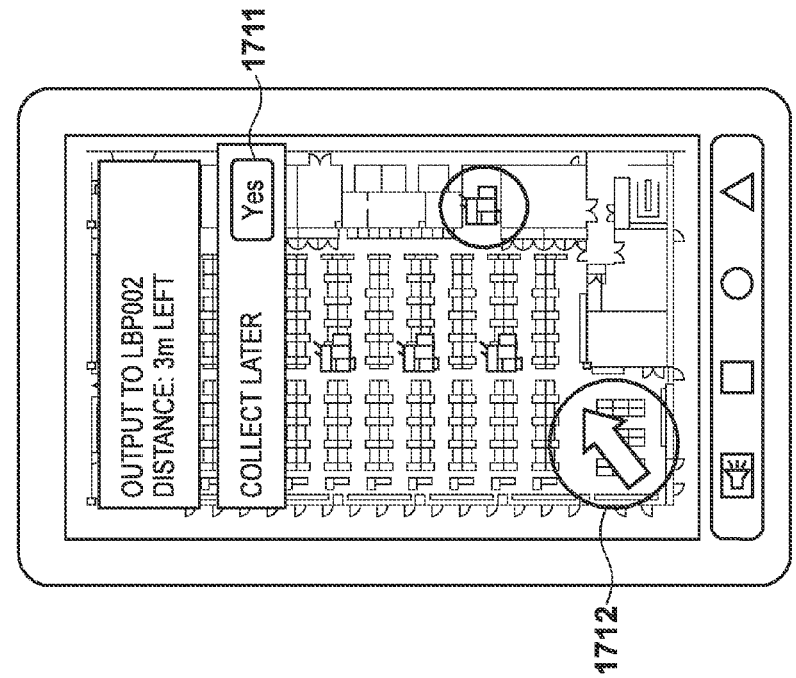
FIGS. 17A and 17B are views showing examples of map display on a mobile terminal.
Figure 17A:
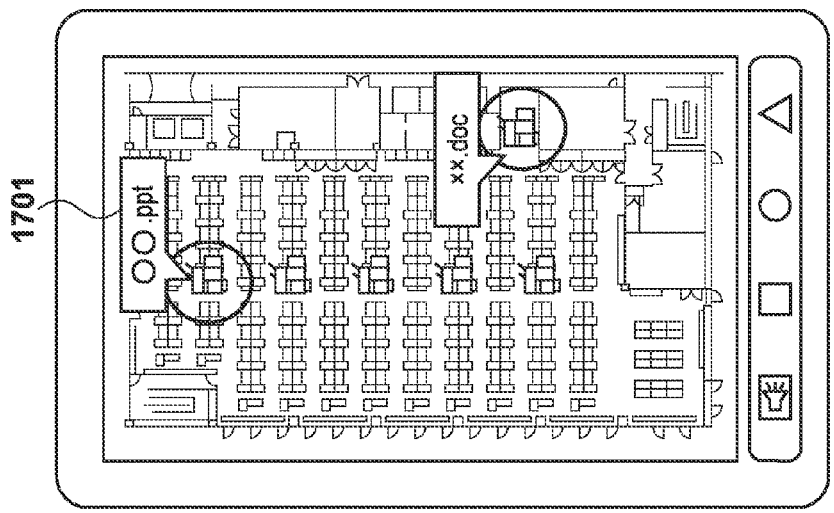

FIG. 17A shows an example of the arrangement of a floor map generated when a print job in the status "uncollected" exists. A case will be exemplified here in which a plurality of print jobs in the status "uncollected" exist in step S1203 of FIG. 12. In this case, document names 1701 of the print jobs in the status "uncollected" are shown for two image forming apparatuses located on the floor represented by the floor map.

Note that only the print job executed latest may be displayed on the floor map as the print job in the status "uncollected". If there are a plurality of print jobs in the status "uncollected" for a single image forming apparatus, the pieces of information may be displayed together. When print jobs in the status "uncollected" exist for image forming apparatuses on the same floor, they may be displayed on the same floor map even if different users have instructed execution of the print jobs.

(Portal Display)

Figure 13:
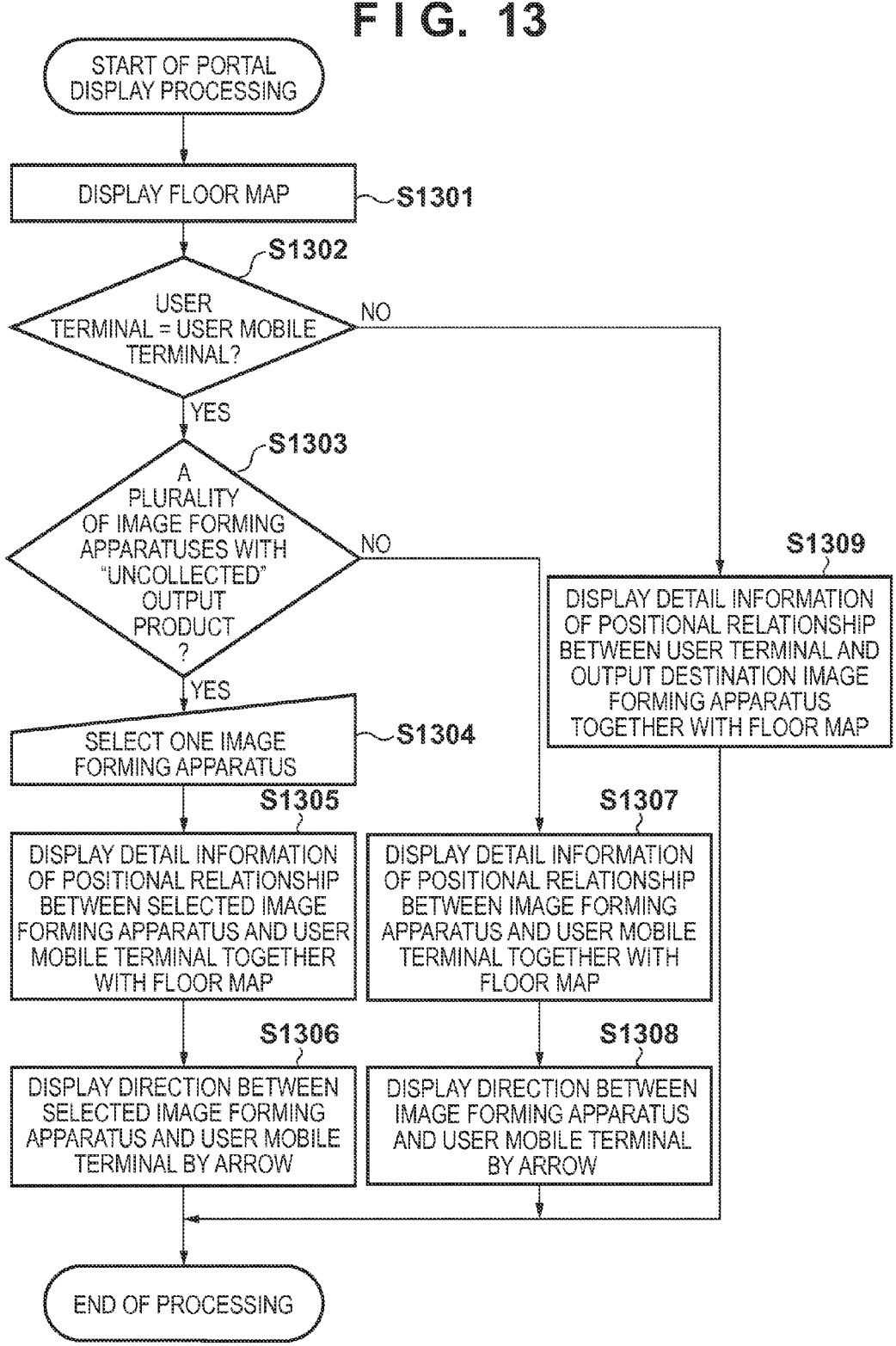
FIG. 13 is a flowchart showing an example of portal display processing.

FIG. 13 is a flowchart showing an example of the portal display in step S1002 of FIG. 10.

In step S1301, the portal 508 displays the floor map generated by the floor map generation processing in step S1001. In step S1302, the portal 508 determines the type of user terminal. If the user terminal is the user mobile terminal 102 (YES in step S1302), the process advances to step S1303. If the user terminal is not the user mobile terminal 102 (NO in step S1302), the process advances to step S1309.

In step S1303, the portal 508 determines whether there are a plurality of image forming apparatuses that have executed print jobs in the status "uncollected". If there exist a plurality of image forming apparatuses that have executed print jobs whose status indicated by the column 906 of the job status table 514 is "uncollected" (YES in step S1303), the process advances to step S1304. If there exists only one image forming apparatus that has executed a print job in the status "uncollected" (NO in step S1303), the process advances to step S1307.

In step S1304, the portal 508 displays the plurality of image forming apparatuses via the web browser 406 of the user mobile terminal 102, and accepts user selection. When the user selects one of the image forming apparatuses, the process advances to step S1305. In step S1305, the portal 508 displays the screen 1604 of the detail information of the positional relationship between the user mobile terminal 102 and the image forming apparatus selected in step S1304 together with the floor map 1601. The screen 1604 of the detail information of the positional relationship is generated based on the location information recorded in the location information log table 513 held by the user terminal information management unit 503 and the location information of the image forming apparatus selected in step S1304. Note that the location information described in the location information log table 513 is the location information sent from the management agent 408 of the user mobile terminal 102.

In step S1306, the portal 508 provides a screen that displays, by an arrow, the direction between the user mobile terminal 102 and the image forming apparatus selected in step S1304. At this time, when the management server 105 acquires information about the orientation of the user from the user mobile terminal 102 together with the location information, the direction of the image forming apparatus can be displayed in consideration of the direction in which the user is oriented. The arrow can be displayed using, for example, an icon 1712 shown in FIG. 17B. Note that the display form of the direction between the image forming apparatus and the user mobile terminal is not particularly limited. Then, the processing procedure ends.

In step S1307, the portal 508 displays the screen 1604 of the detail information of the positional relationship between the user mobile terminal 102 and the image forming apparatus that has output in step S1104 together with the floor map 1601. The detail information of the positional relationship is generated based on the location information recorded in the location information log table 513 held by the user terminal information management unit 503 and the location information of the image forming apparatus that has output in step S1104. Note that the location information described in the location information log table 513 is the location information sent from the management agent 408 of the user mobile terminal 102.

In step S1308, the portal 508 displays, by an arrow, the direction between the user mobile terminal 102 and the image forming apparatus that has output in step S1104. Note that the display form of the direction between the image forming apparatus and the user mobile terminal is not particularly limited. The processing procedure then ends.

In step S1309, the portal 508 displays, via the web browser 401 of the computer 101, the screen 1604 of the detail information of the positional relationship between the user terminal and the image forming apparatus that has output in step S1104 together with the floor map 1601. Then, the processing procedure ends.

[Image Forming Apparatus Selection Processing]

FIGS. 14A and 14B are flowcharts showing an example of the image forming apparatus selection processing procedure (step S1103 of FIG. 11) according to this embodiment.

In step S1401, the device selection processing unit 507 of the management server 105 determines whether a started image forming apparatus exists. In this case, it is determined whether the column 709 indicating the status in the image forming apparatus management table 510 held by the image forming apparatus management unit 502 includes an image forming apparatus with "started". If a "started" image forming apparatus exists (YES in step S1401), the process advances to step S1402. If no "started" image forming apparatus exists (NO in step S1401), the process advances to step S1412.

In step S1402, the device selection processing unit 507 sorts the started image forming apparatuses in ascending order of the distance from the user terminal, and the process advances to step S1403. The distance here indicates a physical distance, and for example, a linear distance is used. However, if the layer (altitude) changes, or an obstacle such as a wall is present, the distance of the detour path or the like may be reflected.

In step S1403, the device selection processing unit 507 determines whether an image forming apparatus on the same floor exists. This determination can be done based on the location information managed by the image forming apparatus management unit 502, including the layer (altitude) and the range indicated by the floor map. If an image forming apparatus on the same floor as that of the user terminal exists (YES in step S1403), the process advances to step S1404. If no image forming apparatus on the same floor as that of the user terminal exists (NO in step S1403), the process advances to step S1409.

In step S1404, the device selection processing unit 507 determines whether an image forming apparatus that meets all printing conditions designated by the user exists among the image forming apparatuses on the same floor. This determination can be done based on, for example, the functions of each image forming apparatus managed on the image forming apparatus management table 510. If an image forming apparatus that meets all printing conditions exists (YES in step S1404), the process advances to step S1405. If none of the image forming apparatuses meets the printing conditions, the process advances to step S1406.

In step S1405, the device selection processing unit 507 decides an image forming apparatus having the shortest distance from the user terminal as an optimum image forming apparatus out of the image forming apparatuses that meet all printing conditions. Then, the processing procedure ends.

In step S1406, the device selection processing unit 507 sorts the image forming apparatuses that meet some of the printing conditions in descending order of the number of conditions met, and the process advances to step S1407. In step S1407, the portal 508 displays a warning screen, and the process advances to step S1408. The warning screen displays an image forming apparatus closest to the user terminal and the list of the image forming apparatuses that meet some of the printing conditions. At this time, the portal 508 may display information representing the met printing conditions as well.

When the user selects an image forming apparatus in step S1408, the device selection processing unit 507 decides the image forming apparatus selected by the user as an optimum image forming apparatus in step S1405.

In step S1409, the device selection processing unit 507 determines whether an image forming apparatus that meets all printing conditions exists among the image forming apparatuses on another floor. If an image forming apparatus that meets all printing conditions exists (YES in step S1409), the process advances to step S1410. If none of the image forming apparatuses meets all printing conditions (NO in step S1409), the process advances to step S1406.

In step S1410, the device selection processing unit 507 sorts the image forming apparatuses that meet all printing conditions in ascending order of the distance from the user terminal, and the process advances to step S1411.

In step S1411, the portal 508 displays a warning screen, and the process advances to step S1408. The warning screen displays the list of the image forming apparatuses on the other floor which meet the printing conditions. At this time, the portal 508 may additionally display information concerning the other floor.

In step S1412, the portal 508 displays a warning screen. The warning screen displays a message representing that no optimum image forming apparatus exists. The processing procedure then ends.

Figure 16B:
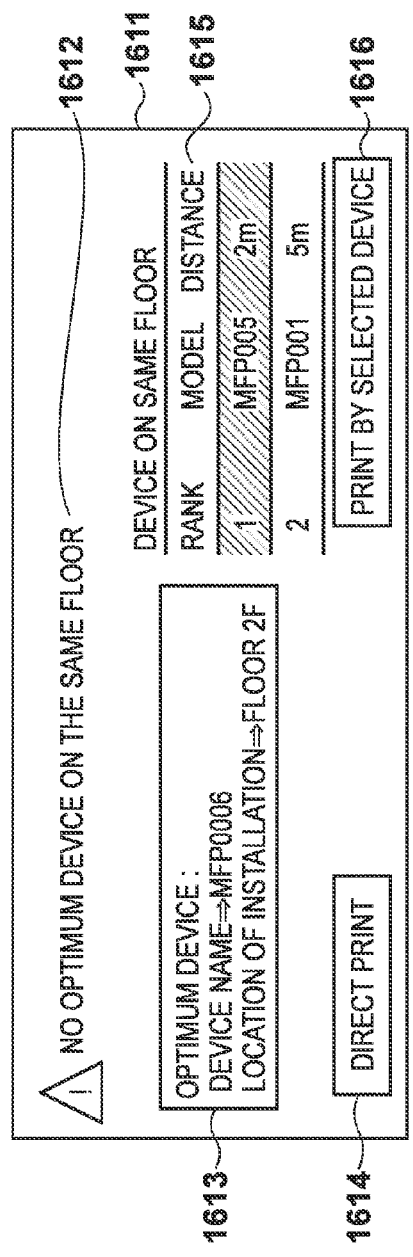

FIG. 16B shows an example of a warning screen displayed in this processing. A warning screen 1611 includes a warning message 1612, an item 1613 indicating an optimum image forming apparatus, a print button 1614, a list 1615 of image forming apparatuses, and a select print button 1616. The warning message 1612 concerns an optimum image forming apparatus. In this case, the warning message represents that no image forming apparatus corresponding to printing conditions is available on the floor where the user terminal is located. The item 1613 represents information of an optimum image forming apparatus based on the position of the user terminal and the printing conditions. When the user presses the print button 1614, the image forming apparatus represented by the item 1613 accepts a print instruction. The list 1615 is a list of image forming apparatuses arranged on the floor where the user terminal is located, and accepts selection of the image forming apparatus to be caused to execute printing from the user. When the user presses the select print button 1616, an instruction to cause the image forming apparatus selected in the list 1615 to print is accepted.

In the processes of steps S1407, S1411, and S1412 shown in FIGS. 14A and 14B, only necessary items out of the constituent elements included in the warning screen 1611 may be displayed. The arrangement of the warning screen is not limited to this.

In this embodiment, the image forming apparatuses are sorted in step S1406 in descending order of the number of met printing conditions. However, the present invention is not limited to this. for example, each condition may be weighted, and image forming apparatuses that meet conditions of high priority may be sorted to higher ranks.

This processing enables to select an optimum image forming apparatus meeting printing conditions in accordance with a user's demand.

Second Embodiment

In this embodiment, coping with a case in which a user who has executed a print job does not immediately collect an output product will be described. In this case, if output product collection by the user is put off, he/she is notified which image forming apparatus has output.

[Flowchart of Selecting Timing to Collect Output Product]

Figure 15:
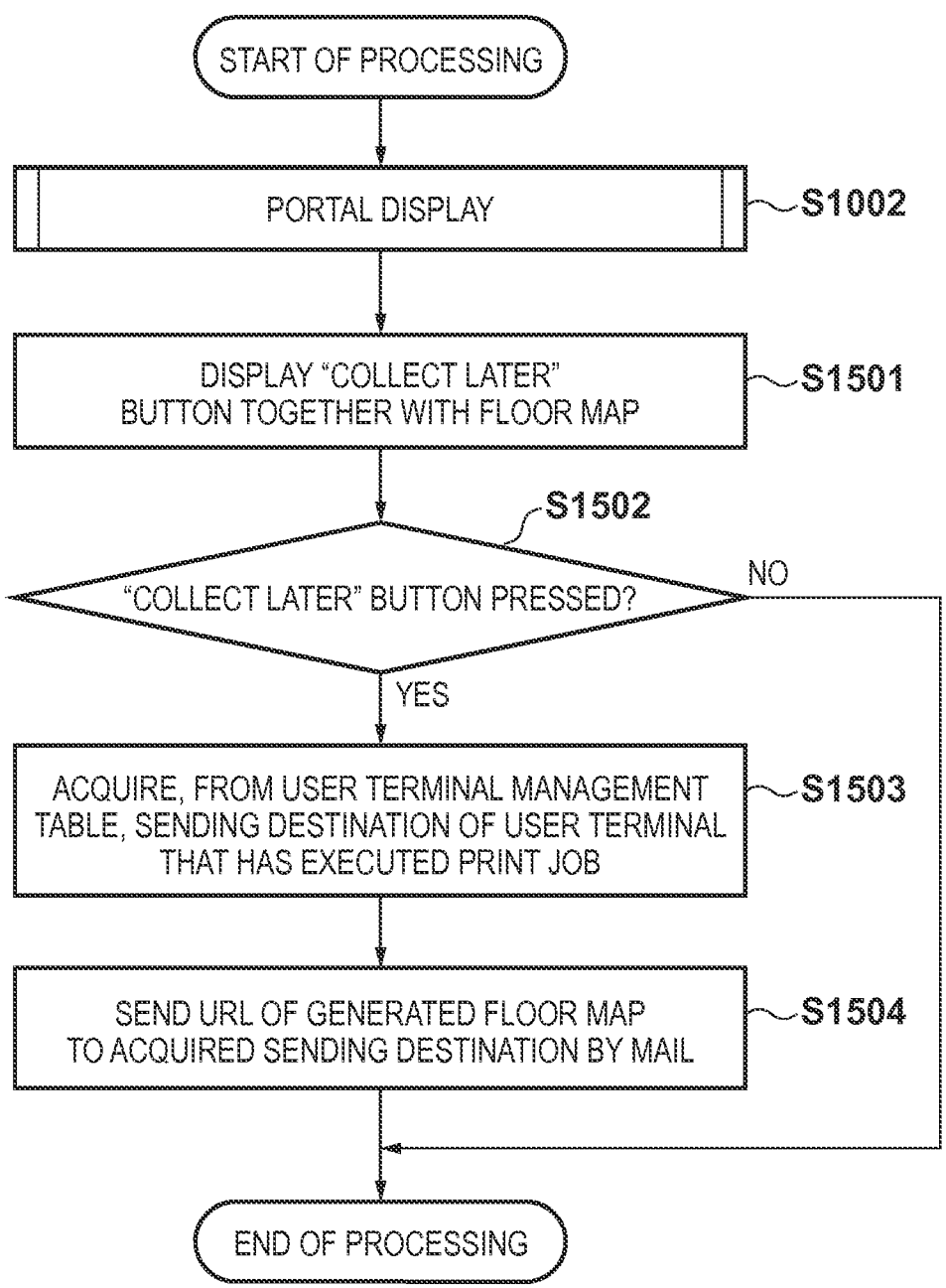
FIG. 15 is a flowchart showing an example of processing of selecting a timing to collect an output product.

FIG. 15 is a flowchart for a network printing system according to the second embodiment. Portal display in step S1002 is the same as the processing shown in FIG. 13 described in the first embodiment, and a description thereof will be omitted.

In step S1501, a portal 508 displays a "collect later" button 1711 together on the floor map of portal display. FIG. 17B shows an example of floor map display according to this embodiment. In this case, the "collect later" button 1711 used to accept an instruction to put off output product collection is displayed on the floor map. In step S1502, the portal 508 determines whether the user has pressed the "collect later" button 1711. If the user has pressed the "collect later" button 1711 (YES in step S1502), the process advances to step S1503. If the user has not pressed the button (NO in step S1502), the processing procedure ends. In this case, the subsequent processing is the same as the processing procedure described in the first embodiment.

In step S1503, the portal 508 acquires the notification destination information of the user terminal that has executed the print job from a user terminal management table 512 held by a user terminal information management unit 503. In step S1504, a mail sending unit 506 sends the URL (Uniform Resource Locator) of the floor map to the acquired notification destination. Then, the processing procedure ends.

Even when collection of the output product of a print job is put off for user's necessities, the server notifies, by mail, the user of the image forming apparatus that has output, thereby preventing the user from forgetting to collect the output product.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-014575, filed Jan. 26, 2012, which is hereby incorporated by reference herein in its entirety.

What is claimed is:

1. A network printing system in which a user terminal instructs printing via a management server,
the management server comprising:
a management unit configured to manage location information and function information of each of a plurality of image forming apparatuses included in the network printing system;
a receiving unit configured to receive, from the user terminal, printing conditions and location information of the user terminal;
a selection unit configured to select an image forming apparatus to execute printing from the plurality of image forming apparatuses in accordance with the received printing conditions and location information of the user terminal;
a generation unit configured to generate a map based on the location information of the user terminal and the location information of the image forming apparatus selected by said selection unit to display a positional relationship between the user terminal and the selected image forming apparatus;
a sending unit configured to send the map generated by said generation unit to the user terminal; and
a collection state management unit configured to manage a collection state of an output product of printing by the image forming apparatus, and
wherein, if there is an image forming apparatus whose output product is uncollected, said generation unit generates the map to display information of print target data corresponding to the output product in correspondence with the image forming apparatus, and
the user terminal comprising a map display unit configured to display the map received from the management server.

2. The system according to claim 1, wherein the generation unit generates the map to display a distance from a position of the user terminal to a position of the selected image forming apparatus.

3. The system according to claim 2, wherein in a case where the user terminal is a mobile terminal, the generation unit updates the distance and the positional relationship between the user terminal and the selected image forming apparatus as the position of the user terminal changes.

4. The system according to claim 1, wherein in a case where the user terminal is a mobile terminal, the generation unit generates the map to display a direction from the user terminal to the selected image forming apparatus by an arrow.

5. The system according to claim 1, wherein
the management server further comprises a display unit configured to display a list to allow a user to select the image forming apparatus to execute printing from the plurality of image forming apparatuses, and
if there is no image forming apparatus that meets all the printing conditions when selecting the image forming apparatus by said selection unit, said display unit displays the plurality of image forming apparatuses sorted in accordance with a met printing condition.

6. A network printing system in which a user terminal instructs printing via a management server,
the management server comprising:
a management unit configured to manage location information and function information of each of a plurality of image forming apparatuses included in the network printing system;
a receiving unit configured to receive, from the user terminal, printing conditions and location information of the user terminal;
a selection unit configured to select an image forming apparatus to execute printing from the plurality of image forming apparatuses in accordance with the received printing conditions and location information of the user terminal;
a generation unit configured to generate a map based on the location information of the user terminal and the location information of the image forming apparatus selected by said selection unit to display a positional relationship between the user terminal and the selected image forming apparatus;
a sending unit configured to send the map generated by said generation unit to the user terminal;
an acceptance unit configured to accept, from a user, an instruction representing whether to put off collection of a printed output product; and
a notification unit configured to notify the user terminal of a URL to display the map in a case where said acceptance unit has accepted an instruction to put off collection of the output product.

7. A management server in a network printing system in which a user terminal instructs printing via the management server, comprising:
a management unit configured to manage location information and function information of each of a plurality of image forming apparatuses included in the network printing system;
a receiving unit configured to receive, from the user terminal, printing conditions and location information of the user terminal;
a selection unit configured to select an image forming apparatus to execute printing from the plurality of image forming apparatuses in accordance with the received printing conditions and location information of the user terminal;
a generation unit configured to generate a map based on the location information of the user terminal and the location information of the image forming apparatus selected by said selection unit to display a positional relationship between the user terminal and the selected image forming apparatus;
a sending unit configured to send the map generated by said generation unit to the user terminal; and
a collection state management unit configured to manage a collection state of an output product of printing by the image forming apparatus, and wherein, if there is an image forming apparatus whose output product is uncollected, said generation unit generates the map to display information of print target data corresponding to the output product in correspondence with the image forming apparatus.

8. A method of controlling a management server in a network printing system in which a user terminal instructs printing via the management server, comprising:
managing location information and function information of each of a plurality of image forming apparatuses included in the network printing system;
receiving, from the user terminal, printing conditions and location information of the user terminal;
selecting an image forming apparatus to execute printing from the plurality of image forming apparatuses in accordance with the received printing conditions and location information of the user terminal;
generating a map based on the location information of the user terminal and the location information of the image forming apparatus selected in the selecting to display a positional relationship between the user terminal and the selected image forming apparatus;
sending the map generated in the generating to the user terminal; and
managing a collection state of an output product of printing by the image forming apparatus, and
wherein, if there is an image forming apparatus whose output product is uncollected, in the generating step, the map is generated to display information of print target data corresponding to the output product in correspondence with the image forming apparatus.

9. A non-transitory computer-readable medium storing a program that causes a computer to function as:
a management unit configured to manage location information and function information of each of a plurality of image forming apparatuses included in a network printing system;
a receiving unit configured to receive, from a user terminal that instructs printing, printing conditions and location information of the user terminal;
a selection unit configured to select an image forming apparatus to execute printing from the plurality of image forming apparatuses in accordance with the received printing conditions and location information of the user terminal;
a generation unit configured to generate a map based on the location information of the user terminal and the location information of the image forming apparatus selected by said selection unit to display a positional relationship between the user terminal and the selected image forming apparatus;
a sending unit configured to send the map generated by said generation unit to the user terminal; and
a collection state management unit configured to manage a collection state of an output product of printing by the image forming apparatus, and
wherein, if there is an image forming apparatus whose output product is uncollected, said generation unit generates the map to display information of print target data corresponding to the output product in correspondence with the image forming apparatus.

10. A management server in a network printing system in which a user terminal instructs printing via the management server, comprising:
a management unit configured to manage location information and function information of each of a plurality of image forming apparatuses included in the network printing system;
a receiving unit configured to receive, from the user terminal, printing conditions and location information of the user terminal;
a selection unit configured to select an image forming apparatus to execute printing from the plurality of image forming apparatuses in accordance with the received printing conditions and location information of the user terminal;
a generation unit configured to generate a map based on the location information of the user terminal and the location information of the image forming apparatus selected by said selection unit to display a positional relationship between the user terminal and the selected image forming apparatus;
a sending unit configured to send the map generated by said generation unit to the user terminal;
an acceptance unit configured to accept, from a user, an instruction representing whether to put off collection of a printed output product; and
a notification unit configured to notify the user terminal of a URL to display the map in a case where said acceptance unit has accepted an instruction to put off collection of the output product.

11. A method of controlling a management server in a network printing system in which a user terminal instructs printing via the management server, comprising:
managing location information and function information of each of a plurality of image forming apparatuses included in the network printing system;
receiving, from the user terminal, printing conditions and location information of the user terminal;
selecting an image forming apparatus to execute printing from the plurality of image forming apparatuses in accordance with the received printing conditions and location information of the user terminal;
generating a map based on the location information of the user terminal and the location information of the image forming apparatus selected in the selecting step to display a positional relationship between the user terminal and the selected image forming apparatus;
sending the map generated in the generating step to the user terminal;
accepting, from a user, an instruction representing whether to put off collection of a printed output product; and
notifying the user terminal of a URL to display the map in a case where, in the accepting step, an instruction to put off collection of the output product has been accepted.

12. A non-transitory computer-readable medium storing a program that causes a computer to function as:
a management unit configured to manage location information and function information of each of a plurality of image forming apparatuses included in the network printing system;
a receiving unit configured to receive, from the user terminal, printing conditions and location information of the user terminal;
a selection unit configured to select an image forming apparatus to execute printing from the plurality of image forming apparatuses in accordance with the received printing conditions and location information of the user terminal;
a generation unit configured to generate a map based on the location information of the user terminal and the location information of the image forming apparatus selected by said selection unit to display a positional relationship between the user terminal and the selected image forming apparatus;

a sending unit configured to send the map generated by said generation unit to the user terminal;

an acceptance unit configured to accept, from a user, an instruction representing whether to put off collection of a printed output product; and a notification unit configured to notify the user terminal of a URL to display the map in a case where said acceptance unit has accepted an instruction to put off collection of the output product.

* * * * *